United States Patent [19]

Kawaguchi et al.

[11] Patent Number: 4,519,977

[45] Date of Patent: May 28, 1985

[54] METHOD FOR MAKING A PLASTIC CONTAINER

[75] Inventors: Kiyoshi Kawaguchi, Yokohama; Muneki Yamada, Ishikawa Fujisawa, both of Japan

[73] Assignee: Toyo Seikan Kaisha Limited, Tokyo, Japan

[21] Appl. No.: 480,308

[22] Filed: Mar. 30, 1983

[30] Foreign Application Priority Data

Sep. 27, 1982 [JP] Japan ............................. 57-166640
Sep. 27, 1982 [JP] Japan ............................. 57-166641
Sep. 27, 1982 [JP] Japan ............................. 57-166642
Nov. 10, 1982 [JP] Japan ............................. 57-196038

[51] Int. Cl.³ .................. B29C 17/03; B29C 17/04; B29D 9/04
[52] U.S. Cl. ........................... 264/550; 264/522; 264/322; 264/323
[58] Field of Search ............ 264/522, 544, 549, 550, 264/322, 323

[56] References Cited

U.S. PATENT DOCUMENTS

| | | | |
|---|---|---|---|
| 2,854,694 | 10/1958 | Mumford | 264/550 |
| 3,184,524 | 5/1965 | Whiteford . | |
| 3,757,718 | 9/1973 | Johnson . | |
| 3,849,530 | 11/1974 | Wyeth et al. | 264/323 X |
| 4,354,996 | 10/1982 | Nishiyama et al. . | |
| 4,420,454 | 12/1983 | Kawaguchi et al. | 264/550 X |

*Primary Examiner*—Jan Silbaugh
*Attorney, Agent, or Firm*—Armstrong, Nikaido, Marmelstein & Kubovcik

[57] ABSTRACT

A tubular plastic container having a molecularly oriented sidewall portion is made by bringing the peripheral portion of a solid blank in engagement with the shoulder portion of a die, introducing the blank into a cavity of the die while compressing with a first and second plungers, such that in the former stage of the introduction, the speed is relatively low and the pressure is relatively high, and then the speed is increased at a controlled rate and the pressure is decreased, thereby forming a hollow molded piece, and then expanding the molded piece to bringing the sidewall portion thereof into contact with the inner surface of the cavity. In the similar manner a tubular plastic container having a sidewall portion formed with thick wall portions axially extending and having a relatively large wall thickness and a large curvature, and thin wall portions axially extending and having a relatively small wall thickness and a small curvature which are formed alternately in the circumferential direction, is made by using the second plunger having recesses corresponding to the thick wall portions and having open edge portions.

6 Claims, 28 Drawing Figures

XXVII   XXVII

METHOD FOR MAKING A PLASTIC CONTAINER

BACKGROUND OF THE INVENTION

The present invention relates to a method and apparatus for making a plastic container and an improvement thereof, and more particularly, to a method and apparatus for making tubular plastic containers whose at least sidewall portions are molecularly oriented and an improvement of such plastic containers.

Tubular plastic containers having molecularly oriented sidewall portions with a relatively small wall thickness (e.g., a thickness of from 0.1 to 0.3 mm) have improved container properties, such as transparency, gas-barrier properties, strength, shock resistance and so forth. However, in case of manufacturing a tubular plastic container of the type mentioned above having a large height-to-diameter ratio (e.g., from 1.5 to 3.0) by an integral molding method, when the sidewall portion is stretched in a solid phase so as to be molecularly oriented, the sidewall portion is undesirably locally thinned, so that it tends to be broken.

Moreover, in case of employing such a plastic container as a container for an acid juice or the like, after a heated juice (e.g., from 75° to 95° C.) is hot-packed, the plastic container is hermetically sealed with a top end portion, and then the hermetically sealed container is relatively rapidly water-cooled down near room temperature. A typical known plastic container of this type, however, has a sidewall portion which is cylindrical and has a practically uniform thickness along the circumferential direction. Therefore, the sidewall portion heated on hot packing thermally shrinks (since it has been molecularly oriented), and a reduction in the inside pressure due to cooling accompanies this, so that the sidewall portion is nonuniformly deformed, producing a local, permanent indentation, which will not recover even after opening. Since containers differ in the position and extent of the permanent indentation produced from each other, the commercial value thereof is remarkably lowered.

Although there are such plastic containers having a sidewall portion in the shape of a square tube with round corners, conventional containers of this type usually have corner portions extremely thin in wall thickness (e.g., about 0.1 mm). Therefore, there has been hitherto a problem that the above-mentioned large permanent indentations are undesirably produced in the corner portions of the plastic containers of this type, causing the commercial value thereof to be lowered.

SUMMARY OF THE INVENTION

An object of the invention is to provide a method and apparatus for manufacturing a tubular plastic container having a molecularly oriented sidewall portion.

Another object of the invention is to provide a method and apparatus suitable for manufacturing a tubular plastic container having a large height-to-diameter ratio as well as a sidewall portion which is molecularly oriented and is relatively small in wall thickness without producing any breakage in the sidewall portion.

A special object of the invention is to provide a tubular plastic container having a molecularly oriented sidewall portion whose commercial value is hardly damaged even on hot packing, together with a method and apparatus for manufacturing the same.

According to one aspect of the present invention there is provided a method of manufacturing a tubular plastic container having a flange portion, a sidewall portion and a bottom wall portion, at least the sidewall portion being molecularly oriented, comprising:

bringing the peripheral edge portion of a molecularly orientable flat plastic blank, having a practically uniform thickness as well as a temperature not higher than the upper limit of the molecularly orientable temperature range of the plastic, corresponding to the flange portion in engagement with the shoulder portion of a die;

introducing the plastic blank into a cavity of the die while compressing the central portion of the plastic blank substantially corresponding to the bottom wall portion by means of a first plunger and a second plunger, the side surface of the first plunger being kept substantially in the molecularly orientable temperature range;

forming the sidewall portion from the material of the plastic blank extending out from between the first plunger and the second plunger by bringing the material into contact with the side surface of the first plunger, thereby forming a hollow molded piece, the formation of the hollow molded piece being such that in the former stage of the introduction, the speed of the introduction is made relatively low and the pressure applied by the first plunger and the second plunger is made relatively large in order to accumulate the material extending out in the gap between the first plunger and the inner surface of the cavity so that the material substantially fills the gap, and then, the speed of the introduction is increased at a controlled rate and at the same time, the pressure is decreased in order to stretch the material accumulated thereby to form the sidewall portion of the hollow molded piece; and discharging a pressurized fluid to the inside of the hollow molded piece while returning the first plunger in order to expand the sidewall portion until the sidewall portion is brought into contact with the inner surface of the cavity held at a temperature not higher than the lower limit of the molecularly orientable temperature range, thereby cooling said sidewall portion to harden.

According to another aspect of the present invention there is provided a method of manufacturing a tubular plastic container having a flange portion, a sidewall portion and a bottom wall portion, the sidewall portion being molecularly oriented as well as having thick wall portions axially extending and having a relatively large wall thickness and a large curvature, and thin wall portions axially extending and having a relatively small wall thickness and a small curvature which are formed alternately in the circumferential direction, comprising:

bringing the peripheral edge portion of a molecularly orientable flat plastic blank, having a practically uniform thickness as well as a temperature not higher than the upper limit of the molecularly orientable temperature range of the plastic, corresponding to the flange portion in engagement with the shoulder portion of a die;

introducing the plastic blank into a cavity of said die while compressing the central portion of the plastic blank substantially corresponding to the bottom wall portion by means of a first plunger and a second plunger, the side surface of the first plunger being kept substantially in the molecularly orientable temperature range, and the second plunger being formed with recesses on the surface facing the first plunger, the recesses corresponding to the thick wall portions, respectively, and having the peripheral edge portions thereof open;

forming the sidewall portion from the material of the plastic blank extending out from between the first plunger and the second plunger by bringing the material into contact with the side surface of the first plunger, thereby forming a hollow molded piece, the formation of the hollow molded piece being such that in the former stage of the introduction, the speed of the introduction is made relatively low and the pressure applied by the first plunger and the second plunger is made relatively large in order to accumulate the material extending out in the gap between the first plunger and the inner surface of the cavity so that the material substantially fills the gap, and then, the speed of the introduction is increased at a controlled rate and at the same time, the pressure is decreased in order to stretch the material accumulated thereby to form the sidewall portion of the hollow molded piece; and discharging a pressurized fluid to the inside of the hollow molded piece while returning said first plunger in order to expand the sidewall portion until the sidewall portion is brought into contact with the inner surface of the cavity held at a temperature not higher than the lower limit of the molecularly orientable temperature range, thereby cooling the sidewall portion to harden.

According to further another aspect of the present invention there is provided an apparatus for manufacturing a tubular plastic container having a flange portion, a sidewall portion and a bottom wall portion, at least the sidewall portion being molecularly oriented, comprising:

a fixed die provided with a cavity with an inside diameter substantially equal to the outside diameter of the sidewall portion;

a first plunger with an outside diameter slightly smaller than the inside diameter of the sidewall portion;

a second plunger with an outside diameter substantially equal to the inside diameter of the cavity;

a first hydraulic cylinder adapted to drive the first plunger for introducing the central portion of a plastic blank substantially corresponding to the bottom wall portion into the cavity while compressing the central portion by means of the first plunger and the second plunger under the state where the peripheral edge portion of the plastic blank corresponding to the flange portion is engaged with the shoulder portion of the die;

a second hydraulic cylinder for bearing the pressure applied to the second plunger;

a flow regulating valve for controlling the speed of the introduction, connected to the second hydraulic cylinder;

means for detecting a point of time when the introduction reaches a predetermined depth; and means for increasing the opening of the flow regulating valve at a controlled rate in response to a signal from the means for detection.

According to still another aspect of the present invention there is provided a tubular plastic container having a flange portion, a sidewall portion and a bottom wall portion, the sidewall portion being molecularly oriented as well as having thick wall portions axially extending and having a relatively large wall thickness and a large curvature, and thin wall portions axially extending and having a relatively small wall thickness and a small curvature which are formed alternately in the circumferential direction.

The above and other objects, features and advantages of the invention will be apparent from the following description when the same is read in conjunction with the accompanying drawings.

DESCRIPTION OF THE PREFERRED EMBODIMENTS

Figure 1:
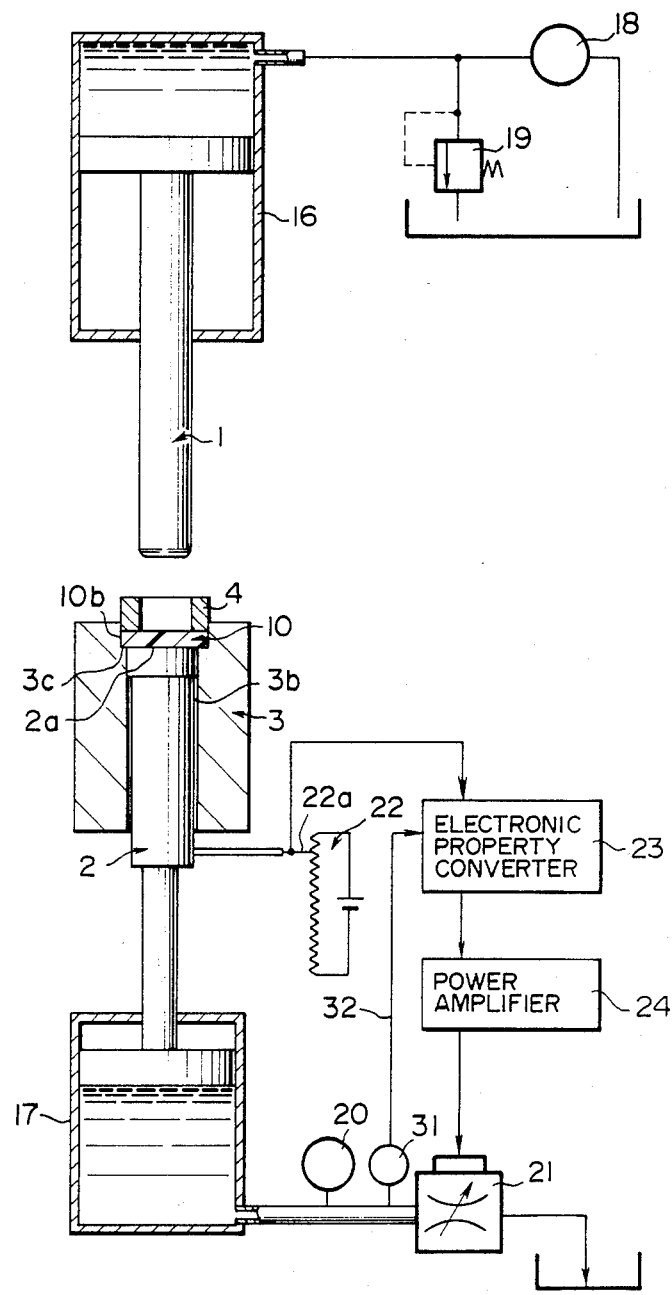
FIG. 1 illustrates an apparatus for manufacturing a plastic container in accordance with a first preferred embodiment of the invention.

In FIG. 1, a reference numeral 1 denotes an upper plunger, while a numeral 2 designates a lower plunger. In addition, reference numerals 3 and 4 represent a die and a holding pad, respectively. As will be shown in more detail in FIGS. 2 through 6, the die 3 is secured to a frame, not shown, and has an upper cavity 3a and a lower cavity 3b formed therein. The upper cavity 3a has a short cylinder-like shape, and the inside diameter thereof is set to be substantially equal to the outside diameter of a flange portion 11a of the container 11 (FIG. 6) to be formed. On the other hand, the lower cavity 3b is cylindrical, and the inside diameter thereof is set to be practically equal to the outside diameter of a sidewall portion 11b of the container 11. The inner surface 3a1 of the upper cavity 33a is connected to the inner surface 3b1 of the lower cavity 3b through a horizontal step portion 3c.

The outside diameter of the upper plunger 1 is set so that a clearance x (see FIG. 4) between the outer surface thereof and the inner surface 3b1 of the lower cavity 3b is larger than a maximum wall thickness y of a sidewall portion 15a of a hollow molded piece 15 formed by the compression stretch molding: e.g., $(x-y)$ is equal to about 0.2 to 0.8 mm.

Figure 4:
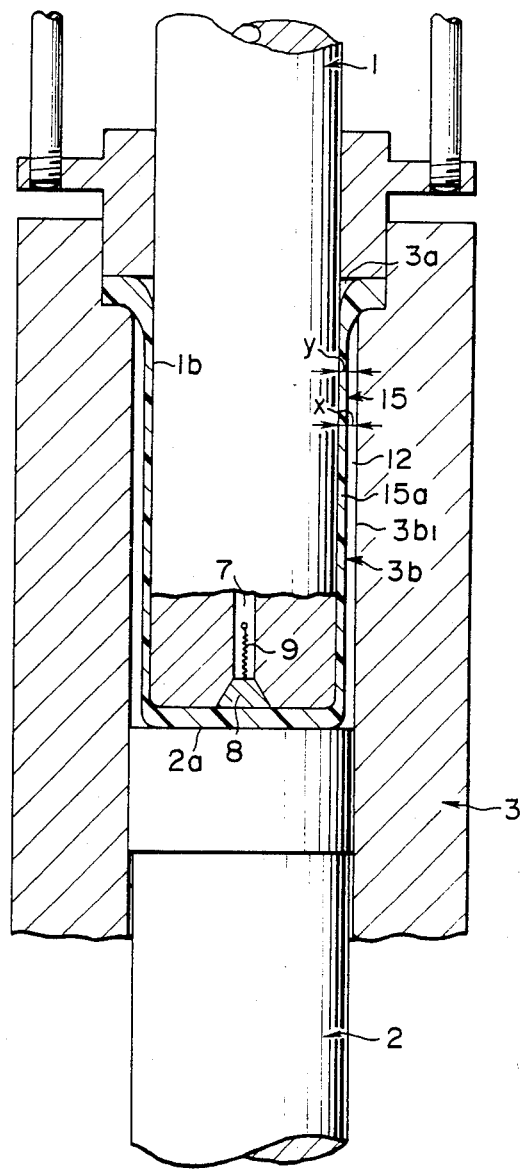
Figure 5:
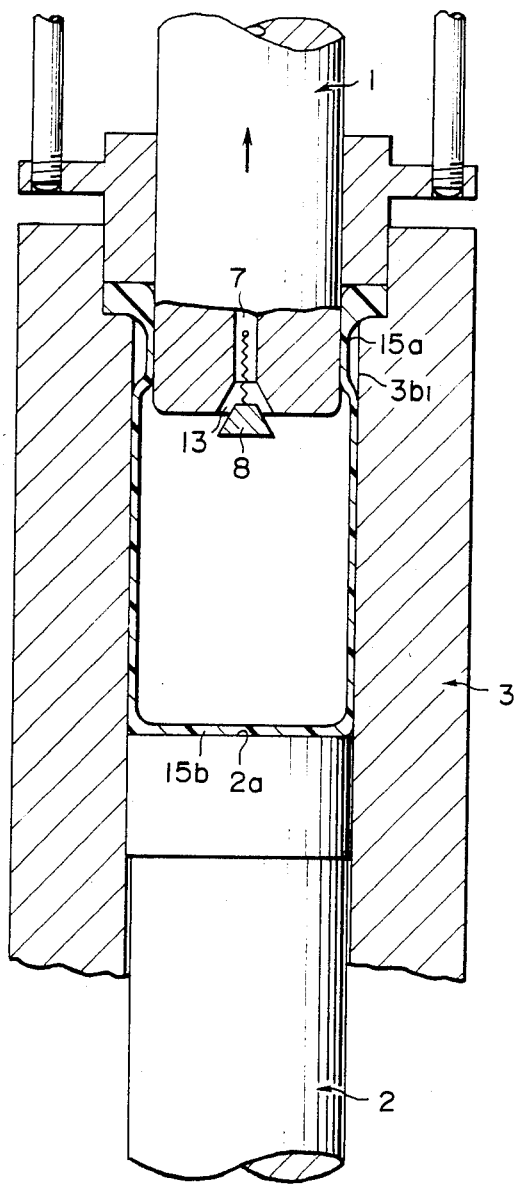

As shown in FIG. 4, the upper plunger 1 has an air inlet bore 7 formed in the axial direction thereof. The lower end opening portion of the air inlet bore 7 is ordinarily closed by means of a truncated cone-shaped plug 8 upwardly pulled by means of a spring 9. The air inlet bore 7 is communicated with a pressurized-air source, not shown, through a duct and a solenoid valve, not shown. The solenoid valve is adapted to be opened by a limit switch, not shown, when the bottom surface 1a of the upper plunger 1 is below the level of the step portion 3c, thereby allowing a pressurized air to be supplied to the air inlet bore 7.

It is to be noted that the upper plunger 1 is made of a metal (e.g., tool steel or the like), and desirably has a smooth hard surface treatment layer (e.g., a hard chrome plating layer) formed on the surface thereof. In addition, a heater, not shown, is incorporated in the upper plunger 1 in order to maintain the temperature of the bottom surface 1a and the side surface 1b to be around the molecularly orientable temperature of the plastic to form the container 11.

In this case, "around the molecularly orientable temperature" $T_1$ involves temperatures not lower than the temperature about 20° C. lower than the lower limit $T_L$ of the molecularly orientable temperature range, explained later, and not higher than the temperature about 60° C. higher than the upper limit $T_U$ of the molecularly orientable temperature range (that is, $T_L-20°$ C. $<T_1<T_U+60°$ C.), more preferably temperatures not lower than the temperature about 20° C. higher than the lower limit $T_L$ of the molecularly orientable temperature range and not higher than the temperature about 20° C. higher than the upper limit $T_U$ of the molecularly orientable temperature range.

The upper part of the lower plunger 2 is adapted to be slidable in the lower cavity 3b, and the upper surface 2a thereof is flat and has a hard surface treatment layer formed thereon.

The holding pad 4 has a hollow portion 4a (FIG. 6), and is adapted to allow the upper plunger 1 to be slidable along the inner surface of the hollow portion 4a. The bottom surface 4b of the holding pad 4 is flat and disposed so as to face the step portion 3c. Moreover, the lower part 4c of the holding pad 4 is adapted to be vertically movable in the upper cavity 3a, and the outside diameter of the lower part 4c is set to be substantially equal to or slightly smaller than the inside diameter of the upper cavity 3a. The holding pad 4 is adapted to be vertically moved by a drive mechanism, not shown, through rods 5.

Referring back to FIG. 1, reference numerals 16, 17 denote hydraulic cylinders for vertically moving the upper plunger 1 and lower plunger 2, respectively. A reference numeral 18 designates a hydraulic pump, while a numeral 19 represents a relief valve adapted to set a maximum load applied to the upper plunger 1 by the hydraulic cylinder 16.

In addition, reference numerals 20, 21 and 31 denote a pressure gauge, a flow regulating valve and a pressure switch, respectively. The flow regulating valve 21 is a proportional electromagnetic type valve in which flow rate is set so as to continuously vary in proportion to the input current supplied to the valve. As will be described later, the flow rate set by the flow regulating valve 21 functions to regulate the introduction speed in case of introducing a substantially central portion 10a of a plastic blank 10 (referred to as simply "blank" hereinafter) into the lower cavity 3b, while compressing the central part 10a by means of the upper and lower plungers 1 and 2. It is to be noted that although not shown, a hydraulic system for raising the upper and lower plungers 1 and 2 independently of each other is annexed to the hydraulic cylinders 16 and 17.

A potentiometer 22 has its movable terminal 22a secured to the lower end portion of the lower plunger 2 so that the lowering distance of the lower plunger 2, i.e., the depth of the above-mentioned introduction, can be detected as a voltage change. A reference numeral 23 denotes an electronic property converter (e.g., M622 Model made by Shimazu Seisakusho Co. Limited) that outputs a properly set nonlinear function voltage with respect to an input voltage signal, while a numeral 24 designates a DC voltage input type flow regulating valve power amplifier.

Figure 7:
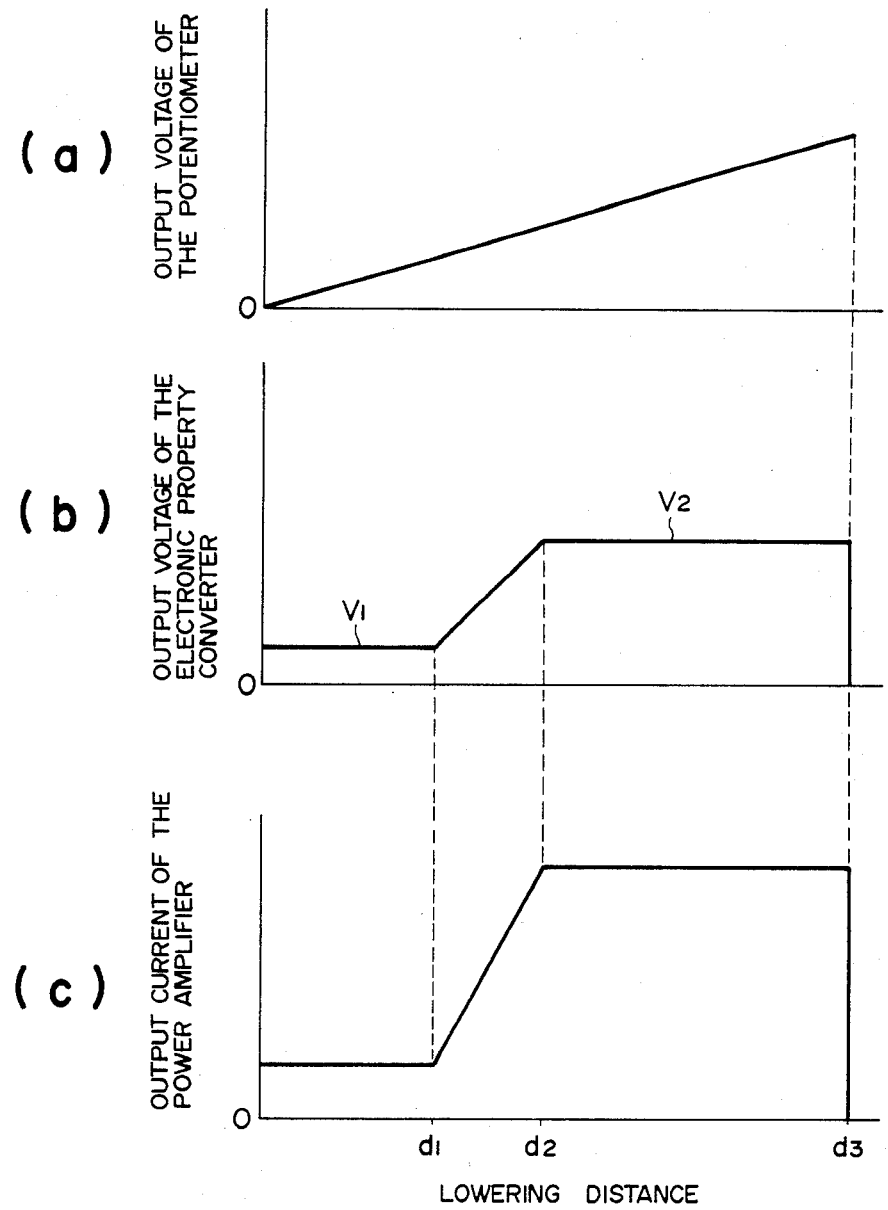
FIGS. 7(a) through 7(c) are graphs showing examples of the relationships between the lowering distance of the lower plunger of the apparatus shown in FIG. 1 on one hand and the output voltage of a potentiometer, the output voltage of an electronic property converter and the output current of a power amplifier on the other, respectively.

The lowering distance of the lower plunger 2 is detected as a voltage by means of the potentiometer 22 as shown in FIG. 7(a). The output voltage signal of the potentiometer 22 is fed to the electronic property converter 23, which is set so as to output, based on this input signal, a relatively low voltage v1 until a lowering distance d1 is reached, but raise the output voltage with a gentle gradient thereafter and output a relatively high voltage $v_2$ after a lowering distance $d_2$ is reached, as shown in FIG. 7(b). The output voltage of the electronic property converter 23 is fed to the power amplifier 24, which outputs a DC current proportional to the input voltage as shown in FIG. 7(c).

It is to be noted that the electronic property converter 23 is adapted to deliver an output voltage in response to a signal 32 transmitted from the pressure switch 31 at the point of time when the pressure switch 31 starts operation (in other words, at the point of time when the pressure applied to the lower plunger 2 reaches a maximum value), but make the output voltage 0 at the point of time when the lower plunger 2 reaches the bottom dead point (corresponding to the lowering distance $d_3$).

The blank 10 mainly consists of a thermoplastic having molecularly orientable properties. Plastics of this kind include crystalline polyolefin, such as isotactic polypropylene, high-density polyethylene, medium-density polyethylene and low-density polyethylene, linear polyester, e.g., polyethylene terephthalate, polycarbonate, polyvinyl chloride, nitrile resins, or their copolymers or blends. In the case where a plastic container as a commercial product does not specially require transparency, such a material may be employed as obtained by mixing one of the above-mentioned plastics with fillers such as talc, calcium carbonate, mica flake and the like.

The blank 10 is formed by cutting into a predetermined size a sheet constituted solely by a molecularly orientable thermoplastic of the kind mentioned above, or a laminate or blend formed by laminating or blending, with one of the above-mentioned molecularly orientable thermoplastics employed as a main body, a resin with oxygen gas-barrier properties, e.g., ethylene-vinyl alcohol copolymer, polyamide, cellulosic resin, polyacrylonitrile, polyvinylidene chloride or polyvinyl alcohol.

The thickness of the blank 10 is preferably practically uniform and about from 1 to 6 mm, and more preferably about 2 to 4 mm. This is because if the thickness is smaller than about 1 mm, especially the bottom portion of a plastic container being molded is apt to break and on the other hand, if the thickness is larger than about 6 mm, portions near the flange are apt to break.

In this specification, the molecularly orientable temperature means a temperature at which high-molecular chains of a molecularly orientable plastic to form the sidewall portion 11b of the plastic container 11 formed according to the invention are more oriented as compared with that formed by an ordinary melt molding, so that there is improvement in the mechanical strength, gas-barrier properties, transparency and so forth.

For example, the molecularly orientable temperature range of isotactic polypropylene is between its melting point ($T_U$) and about 120° C. ($T_L$); that of a linear polyester resin such as polyethylene terephthalate is between its glass transition temperature ($T_L$) and its cold crystallization point ($T_U$); that of amorphous plastic such as polyvinyl chloride, nitrile resin or polycarbonate is between its glass transition temperature ($T_L$) and its liquid-state flow starting point; and that of a laminate mainly constituted by a polyolefin resin and ethylene-vinyl alcohol copolymer is between the melting point ($T_U$) of the polyolefin resin concerned and $(1.64M + 20)°$ C. ($T_l$), where M is the vinyl alcohol content (mol.%) of the latter.

It is to be noted that in this specification the melting point of a crystalline plastic is defined as the peak temperature of a melting endothermic curve measured by means of the differential thermal analysis under the atmospheric pressure. In addition, the liquid-state flow starting point of an amorphous plastic is defined as the temperature at which a resin starts liquid-state flow discharge from a nozzle having a diameter of 1 mm and a length of 10 mm when heated under a plunger pressure of 160 kg/cm² and at a uniform rate by employing a KOUKA type flow tester represented by JIS K6719 (herein JIS represents Japanese Industrial Standards).

The container 11 is manufactured by employing the above apparatus and blank 10 as follows.

The blank 10 (the thickness is generally about from 1.5 to 4.0 mm), which is at room temperature or previously uniformly heated up to a temperature lower than the upper limit of the molecularly orientable temperature range, is mounted on the step portion 3c under the state where the upper surface 2a of the lower plunger 2 is on the same level as the step portion 3c as shown in FIG. 1. Immediately thereafter, the peripheral edge portion 10b of the blank 10 is clamped with a predetermined, relatively small pressing force applied by the holding pad 4.

Figure 2:
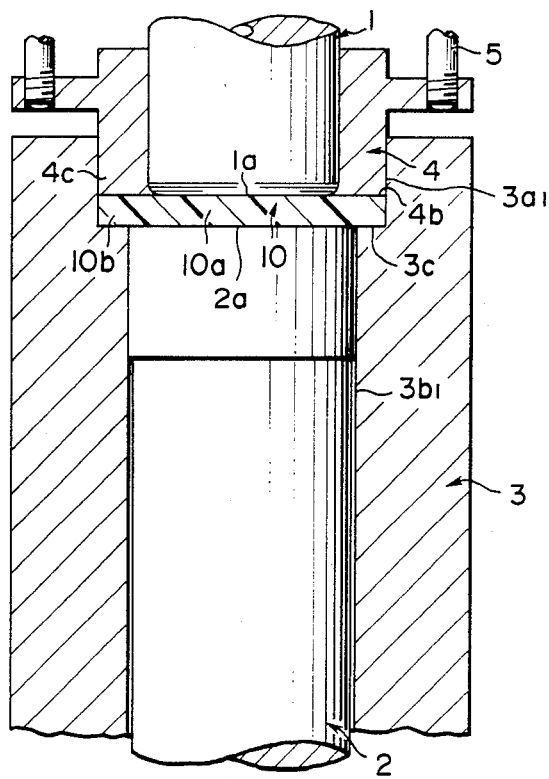
FIGS. 2 through 6 are sectional side elevational views of important parts of the apparatus shown in FIG. 1, for particularly showing processes of manufacturing a plastic container by employing the apparatus shown in FIG. 1, respectively, FIG. 2 illustrating a state just before the starting of molding, FIG. 3 illustrating the former stage of the molding, FIG. 4 illustrating the state where a hollow molded piece is fully formed, FIG. 5 illustrating the state where a gas is blown into the hollow molded piece, FIG. 6 illustrating a state just after completion of manufacture of the plastic container.
Figure 3:
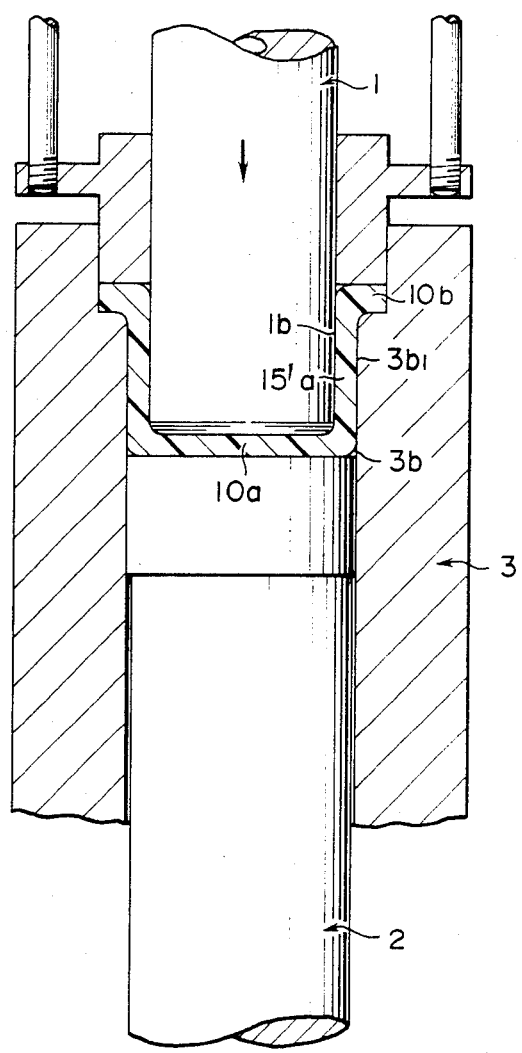
Figure 8:
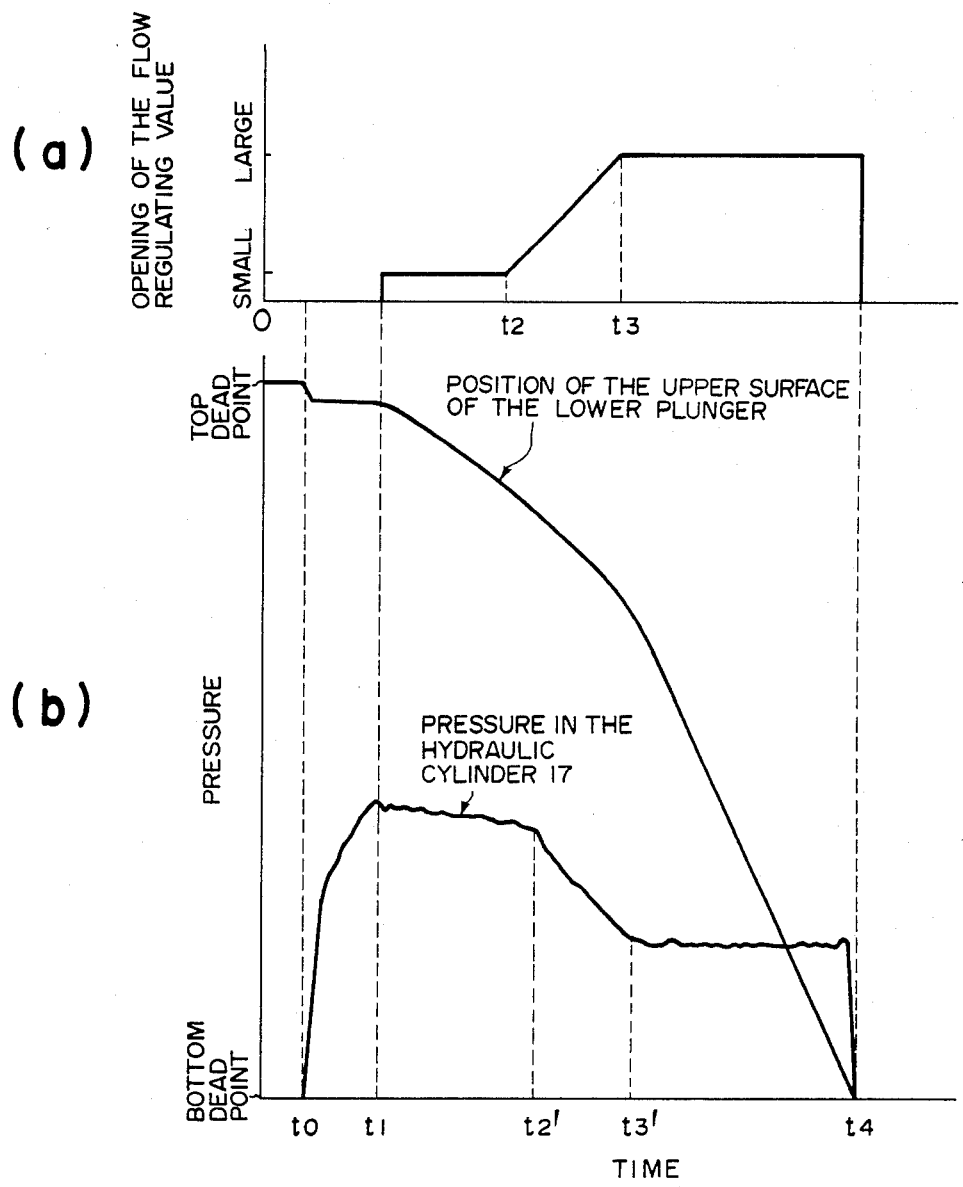
FIGS. 8(a) and 8(b) are graphs showing examples of the changes with time, of the opening of a flow regulating valve of the apparatus shown in FIG. 1, the position of the upper surface of the lower plunger thereof and the pressure in a hydraulic cylinder thereof.

Then, the hydraulic pump 18 is actuated to lower the upper plunger 1 until the upper and lower plungers 1 and 2 are brought into contact with the substantially central portion 10a of the blank 10 as shown in FIG. 2. Since the output voltage of the electronic property converter 23 is 0 at this point of time ($t_o$ in FIG. 8), the flow regulating valve 21 is in the closed state (i.e., the opening is 0). Consequently, at the point of time $t_1$ in FIG. 8, the pressing force applied to the blank 10 reaches the maximum value set by the relief valve 19. At this point of time $t_1$, in response to the signal from the pressure switch 31, the electronic property converter 23 is turned ON to deliver a relatively low voltage $v_1$, and at the same time, the flow regulating valve 21 is brought into a "small" opening state (FIG. 8(a)). Consequently, the substantially central portion 10a of the blank 10 is introduced into the lower cavity 3b at a relatively low speed while being compressed with a relatively large pressing force applied by the upper and lower plungers 1 and 2 as shown in FIG. 8(b). Consequently, a sidewall portion 15'a formed by the material extending out from between both the plungers 1 and 2 substantially fills the gap between the inner surface $3b_1$ of the lower cavity 3b and the side surface 1b of the upper plunger 1. In other words, in the former stage of the lowering, the material is accumulated in the gap.

Next, when the lowering distance of the lower plunger 2 reaches a point $d_1$ in FIG. 7(a) (in general, about from 15 to 40% of the full stroke, i.e., $d_3$), the output current of the electronic property converter rises with a certain gradient until a point $d_2$ is reached as shown in FIG. 7(b). In correspondence thereto, the output current of the power amplifier 24 also increases with a certain gradient (FIG. 7(c)). Consequently, the flow regulating valve 21 is opened at a controlled rate after the point of time $t_2$, and the opening there becomes "large" at the point of time $t_3$ corresponding to the lowering distance $d_2$ (FIG. 8(a)).

Meantime, as shown in FIG. 8(b), the lowering speed of the lower plunger 2 increases not extremely rapidly but at a controlled rate. Also the pressure applied to the blank 10 decreases at a controlled rate after a point of time $t_2'$ (the point of time $t_2'$ is slightly behind the point of time $t_2$ owing to a time lag), and settles at a certain fixed value after a point of time $t_3'$ substantially equal to the point of time $t_3$.

After the point of time $t_3$, the lower plunger 2 lowers relatively rapidly. After the point of time $t_2'$, particularly after the point of time $t_3'$, since the pressure applied to the substantially central portion 10a of the blank 10 decreases, the material extending out from between both the plungers 1 and 2 decreases in amount, while the lowering speed increases. Therefore, a tension is applied to the accumulated material forming the sidewall portion $15'a$, stretching the sidewall portion $15'a$. At this time, molecular orientation takes place.

Accordingly, in the latter stage of the lowering after the former stage (after the point of time $t_2'$), the sidewall portion 15a (FIG. 4) is formed by both the material supplied by stretching the sidewall portion $15'a$ and a slight amount of material extending out from between both the plungers 1 and 2. Therefore, at the point of time when the lowering is completed, i.e., the point of time ($t_4$ in FIG. 8 corresponding to $d_3$ in FIG. 7) where the hollow molded piece 15 is formed, a gap 12 is formed between the sidewall portion 15a and the inner surface $3b_1$ of the lower cavity 3b as shown in FIG. 4.

It is to be noted that during the molding, the inner surface $3b_1$ of the lower cavity 3 and the upper surface 2a of the lower plunger 2 are maintained at a temperature slightly lower (generally about from 20° to 50° C. lower) than the lower limit of the molecularly orientable temperature range of the plastic concerned, for example, at about from 70° to 100° C. in the case of polypropylene by means of the built-in heater, not shown.

If the reduction in the pressure is effected rapidly by employing a pressure regulating valve, for example, at the moment of the rapid reduction the lowering speeds of the plungers 1 and 2 abruptly increase, applying an instantaneous and abrupt tension to the accumulated material for the sidewall portion $15'a$. As a result, such problems are liable to arise that the sidewall portion 15a breaks during stretching or a locally thin wall portion is produced. Therefore, the rate of reducing the pressure is set and controlled by the electronic property converter 23 so as to become a value below the upper limit of a range in which the above-mentioned problems will not arise and at the same time as high as possible in order to improve the productivity. It is to be noted that in case where $d_3$ is 100 mm, the time from $t_1$ to $t_4$ is generally on the order of from 0.3 to 1.5 sec.

As the upper plunger 1 is raised thereafter, the plug 8 is lowered by means of an air pressure, so that a pressurized air is blown out from the gap 13 between the plug 8 and the opening portion of the air inlet bore 7, thereby allowing the hollow molded piece 15 to be blow-molded (at this time a slight molecular orientation takes place) with the bottom wall portion 15b brought into close contact with the upper surface 2a of the lower plunger 2 as well as the sidewall portion 15a brought into close contact with the inner surface $3b_1$ of the lower cavity 3b.

Then, the hollow molded piece 15 is hardened on cooling the same down to a temperature lower than the molecularly orientable temperature of the material.

Figure 6:
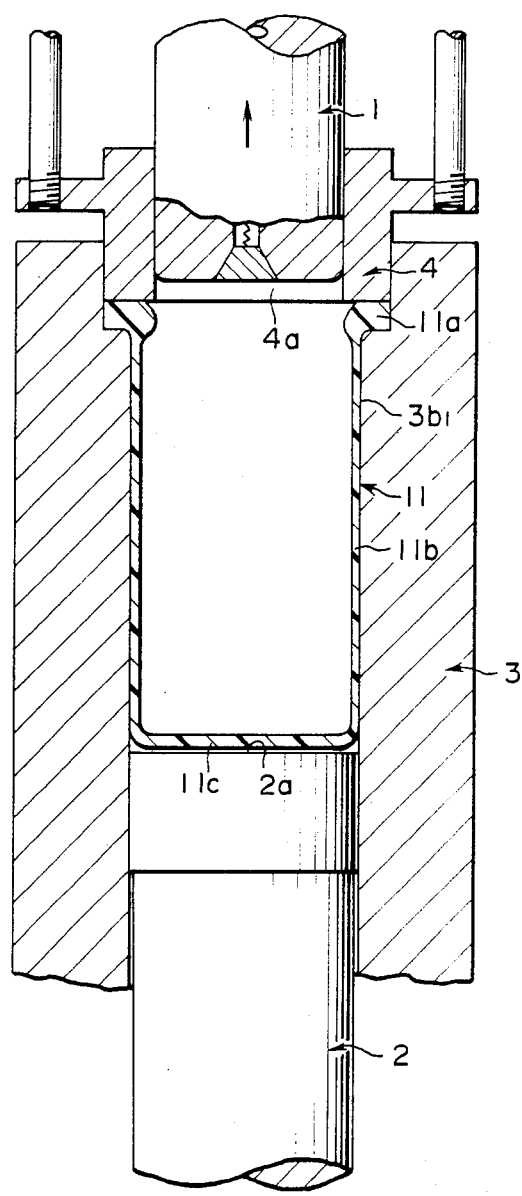

Thus, the container 11 is formed having the flange portion 11a, the sidewall portion 11b and the bottom wall portion 11c as shown in FIG. 6. After the upper plunger 1 comes out of the container 11, the holding pad 4 and the lower plunger 2 are raised to extract the container 11 from the die 3.

Figure 9:
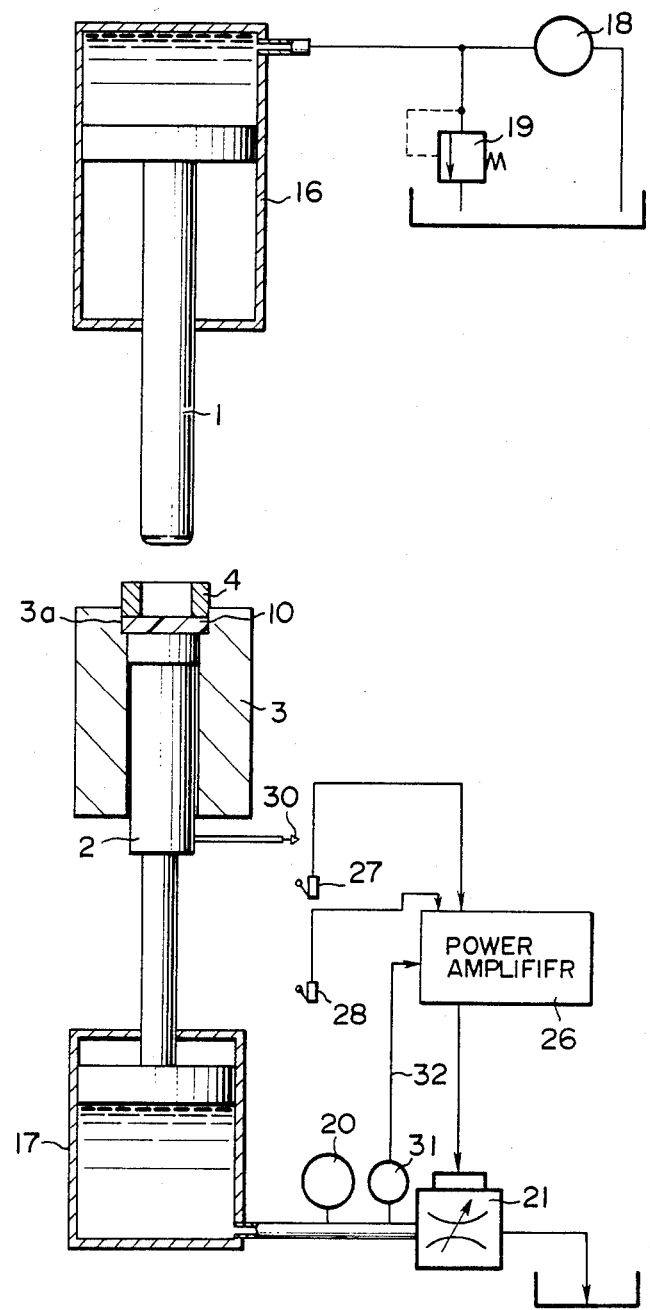
FIG. 9 illustrates an apparatus for manufacturing a plastic container in accordance with a second preferred embodiment of the invention.
Figure 10:
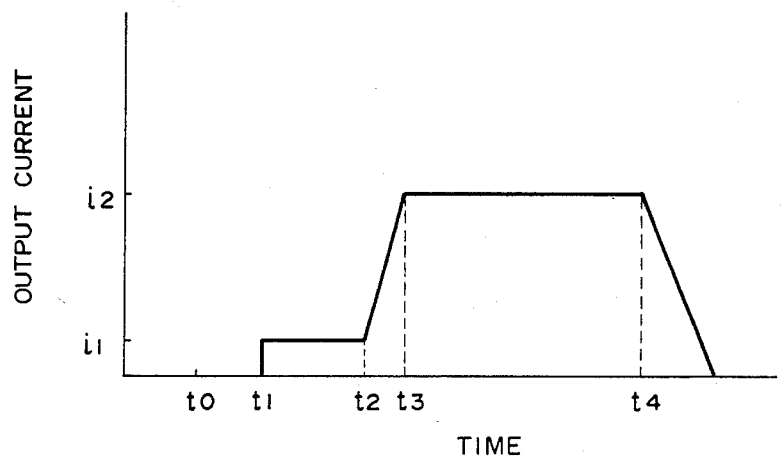
FIG. 10 is a graph showing the change with time, of the output current of an acceleration/deceleration signal type flow regulating valve power amplifier employed in the apparatus shown in FIG. 9.

FIG. 9 shows an apparatus for manufacturing plastic containers in accordance with another preferred embodiment of the invention, particularly for controlling the opening of the flow regulating valve 21. The same portions or member as those shown in FIG. 1 are denoted by the same reference numerals. An acceleration/deceleration signal type flow regulating valve power amplifier (e.g., AMET Model made by Yuken Kogyo Co. Limited) 26 is arranged such that when turned ON, it outputs a relatively small current $i_1$ (FIG. 10), and when a limit switch 27 (a proximity switch may be employed instead) is turned ON at the point of time $t_2$, a built-in relay is actuated to increase the output current with a predetermined gradient, which output current reaches a predetermined value $i_2$ at the point of time $t_3$ and becomes 0 when a limit switch 28 (a proximity switch may be employed instead) is turned ON at the point of time $t_4$.

It is to be noted that the power amplifier 26 is adapted to be turned ON in response to a signal 32 transmitted from the pressure switch 31 at the point of time $t_1$ when the pressure switch 31 starts operation.

A symbol $t_0$ denotes a point of time when the upper plunger 1 is brought into contact with the blank 10. As the lower plunger 2 lowers and when the lowering distance thereof reaches a distance corresponding to $d_1$ in FIG. 7, a contactor 30 secured to the lower plunger 2 causes the limit switch 27 to turn ON. As the lower plunger 2 further lowers and when the bottom dead point (a point corresponding to the point $d_3$ in FIG. 7) is reached, the limit switch 28 is turned ON. The output current of the power amplifier 26 controls the opening of the flow regulating valve 21 in the same manner as that in the embodiment shown in FIG. 1. The process of manufacturing the container 11 in the embodiment shown in FIG. 9 is the same as that in the first-mentioned embodiment shown in FIG. 1.

Thus, it is possible to obtain the plastic container 11 in which the height-to-outside diameter ratio of the sidewall portion 11b is about from 1.5 to 3, and the wall thickness of the sidewall portion 11b is small (about from 0.1 to 0.3 mm) as well as practically uniform, and, moreover, the sidewall portion 11b has been improved in container properties such as transparency, gas-barrier properties and so forth owing to the molecular orientation. It is to be noted that in case of requiring a relatively thick sidewall portion 11b according to use, it is, as a matter of course, possible to obtain a plastic container having the sidewall portion 11b with a wall thickness of about from 0.3 to 1.2 mm, for example.

Examples will be described hereinunder.
Example 1:

In FIG. 9, the inside diameter of each of the hydraulic cylinder 16 and the hydraulic cylinder 17 is 100 mm. The pressure set value of the relief valve 19 was set to be 45 kg/cm², and the acceleration/deceleration signal type flow regulating valve power amplifier 26 was regulated so that the flow rate obtained when the opening of the flow regulating valve 21 was "small" would be 13.5 l/min. and the flow rate obtained when the opening thereof was "large" would be 100 l/min. Moreover, the limit switch 27 was mounted through regulating the position thereof so that the limit switch 27 would be turned ON when the lower plunger 2 is lowered 15 mm from the top dead point.

A blank made of a polypropylene homopolymer with a melt flow index of 5 g/10 min. and having a thickness of 3 mm and a diameter of 60 mm was heated up to 145° C. by means of an oven and then inserted into the upper cavity 3a of the apparatus shown in FIG. 9. With the blank periphral portion held with a pressure of about 2 kg/cm$^2$ by the holding pad 4, the upper plunger 1 was lowered to press the central portion of the blank.

The pressure inside the hydraulic cylinder 17 bearing the lower plunger 2 rapidly increases to turn ON the pressure switch 31 previously regulated so as to generate a signal at a pressure slightly lower than 45 kg/cm$^2$.

In response to the signal from the pressure switch 31, the flow regulating valve 21 is opened. Consequently, the oil inside the hydraulic cylinder 17 bearing the lower plunger 2 flows out at a flow rate of 13.5 l/min., causing the lower plunger 2 to lower. The arrangement was such that at the position where the lower plunger 2 lowered 15 mm from the top dead point, the limit switch 27 would be made ON, gradually increasing the flow rate of the flow regulating valve to 100 l/min. so that the pressure inside the hydraulic cylinder 17 would be 20 kg/cm$^2$. After the lower plunger lowered to a depth of 100 mm, the flow rate of the flow regulating valve was made 0 by means of the limit switch 28, thereby suspending the lowering of the lower plunger 2 and the upper plunger 1. It is to be noted that the times between $t_0$ and $t_1$, $t_1$ and $t_2$, $t_2$ and $t_3$, and $t_3$ and $t_4$ were 0.6 sec., 0.2 sec., 0.2 sec. and 0.4 sec., respectively.

Thereafter, the upper plunger 1 was pull up while air was being introduced under a pressure of 6 kg/cm$^2$ from the bottom surface of the upper plunger 1. Moreover, the holding pad 4 and the lower plunger 2 were raised, thereby obtaining a transparent container excellent in the sidewall thickness distribution, having an average sidewall thickness of 0.3 mm, a height of 95 mm and an inside diameter of 52 mm.

Unlike the above embodiment in which the peripheral portion of the plastic blank being molded is engaged with the die shoulder portion by employing the holding pad, the peripheral portion of the blank may be engaged, without using the holding pad, with the die shoulder portion by employing a die whose upper cavity is constituted by a short cylinder-shaped portion and an upwardly diverging taper portion connecting to the upper end thereof, and whose step portion is constituted by an annular groove connecting to the lower end of the short cylinder-shaped portion and an annular land formed at the inner side of the annular groove, and employing a blank having a diameter made slightly larger than the inside diameter of the short cylinder-shaped portion and a thickness made smaller than the height of the short cylinder-shaped portion, and then forcing (i.e., tightly inserting) the blank into the short cylinder-shaped portion by means of the upper plunger.

This embodiment will be described hereinunder.

The same reference numerals denote the same or similar portions or members in FIGS. 11 through 16 as those shown in FIGS. 2 through 6. A die 103 is secured to a holding member, not shown, and has an upper cavity 103a and a lower cavity 103b (see FIG. 15). The upper cavity 103a has a short cylinder-shaped portion 103a$_1$ with an inside diameter practically equal to the outside diameter of a flange portion 11a of a plastic container 111 to be formed (although the inside diameter of the upper cavity 103a and the outside diameter of the flange portion 111a are exactly equal to each other just after completion of formation, the latter is smaller than the former by the thermal contraction portion after cooling), and a height slightly larger than the thickness of the blank 10 to be loaded, together with an upwardly diverging taper portion 113a$_2$ connecting to the upper end of the short cylinder-shaped portion 103a$_1$. The lower cavity 103b is cylindrical and has an inside diameter practically equal to the outside diameter of a sidewall portion 11b of the plastic container 111 to be formed.

The inner surface 103a$_1$' of the short cylinder-shaped portion 103a$_1$ of the upper cavity 103a and the inner surface 103b' of the lower cavity 103b connect to each other through a step portion 103c. The step portion 103c is constituted by an annular groove 103c$_1$ connecting to the lower end of the inner surface 103a$_1$' of the short cylinder-shaped portion 103a$_1$ and an annular land 103c$_2$ located at the inner side of the annular groove 103c$_1$ and connecting to the upper end of the inner surface 103b' of the lower cavity 103b.

The outside diameter of the blank 10 is set so that the blank 10 can be tightly inserted into the short cylinder-shaped portion 103a$_1$ of the upper cavity 103a. In other words, the outside diameter of the blank 10 at the temperature where it is loaded into the short cylinder-shaped portion 103a$_1$ is set to be larger, preferably from several tens of $\mu$m to several $\mu$m larger than the inside diameter of the short cylinder-shaped portion 103a$_1$.

Except for the above-mentioned aspects, the structure, action and so forth of each of the portions are the same as those shown in FIGS. 2 through 6.

The plastic container 111 is manufactured by employing the above molding apparatus as follows, for example.

Figure 11:
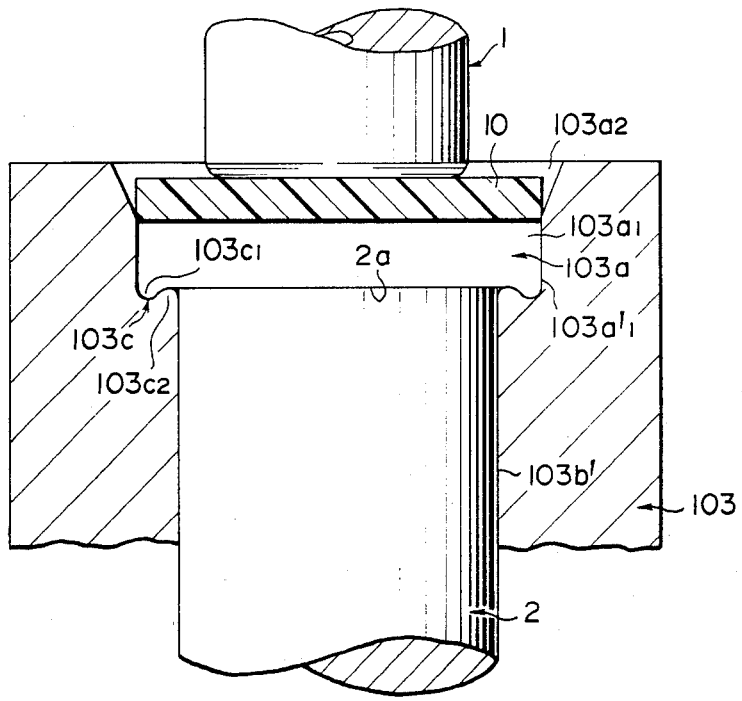
FIGS. 11 through 16 are sectional side elevational views of important parts, for illustrating processes of manufacturing a plastic container by employing a die having a step portion with a structure different from that shown in FIG. 2, FIG. 11 illustrating the state where a blank is mounted on the upper end part of a short cylinder-shaped portion of an upper cavity, FIG. 12 illustrating the state where the blank is tightly inserted into the short cylinder-shaped portion, FIG. 13 illustrating an initial state of introduction of the center portion of the blank into a lower cavity, FIG. 14 illustrating a state in a former stage of the introduction, FIG. 15 illustrating the state where the introduction is completed and a hollow molded piece is formed, FIG. 16 illustrating the state where the molding of a plastic container is completed.
Figure 12:
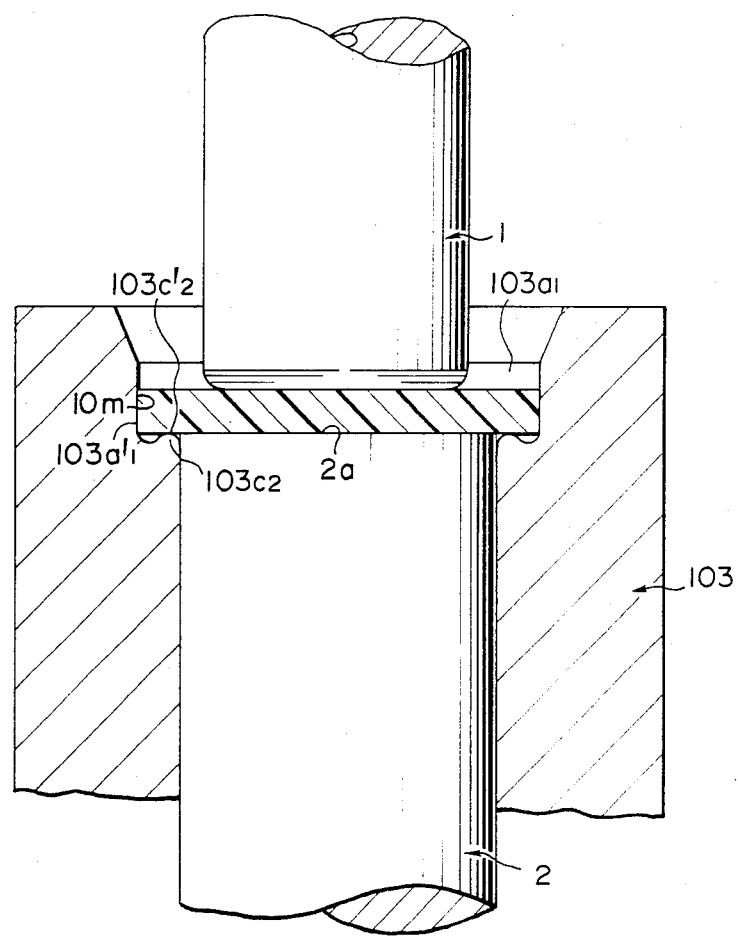

As shown in FIG. 11, the blank 10 at room temperature or heated up to a predetermined temperature is mounted on the upper end portion of the short cylinder-shaped portion 103a$_1$ of the upper cavity 103a. Then, as shown in FIG. 12, the upper plunger 1 is lowered to force the plastic blank 10 into the upper cavity 103a. Since at this point of time, the upper surface 2a of the lower plunger 2 is stationary on the level of the top portion 103c$_2$' of the annular land 103c$_2$, the lower surface of the blank 10 is brought into contact with the upper surface 2a and the top portion 103c$_2$'. Moreover, the side surface 10m of the blank 10 is brought into close contact with the inner surface 103a$_1$' of the short cylinder-shaped portion 103a$_1$ under a pressure in the radial direction.

Figure 13:
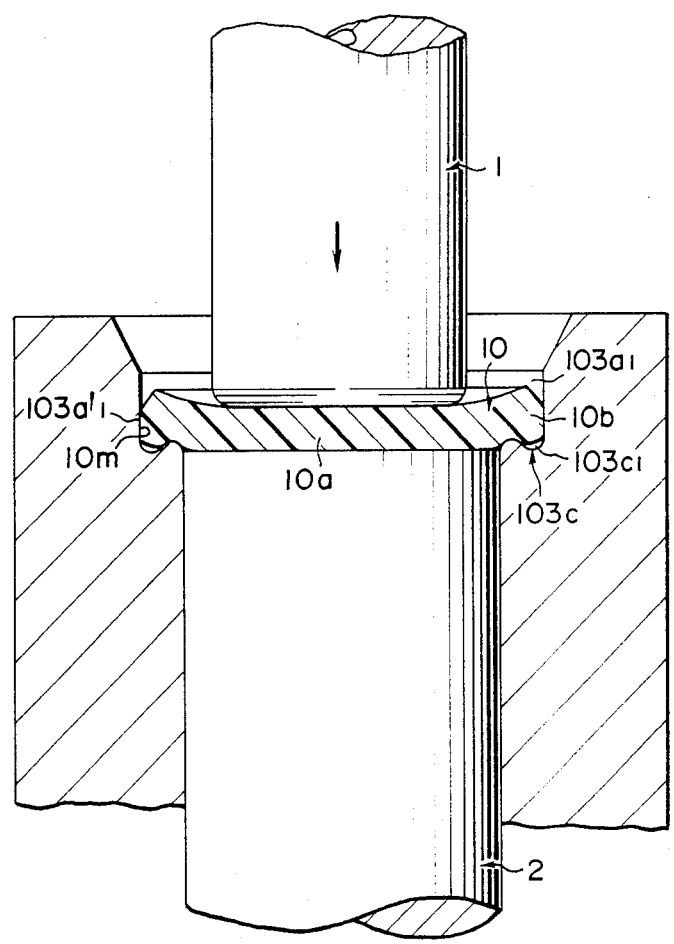
Figure 14:
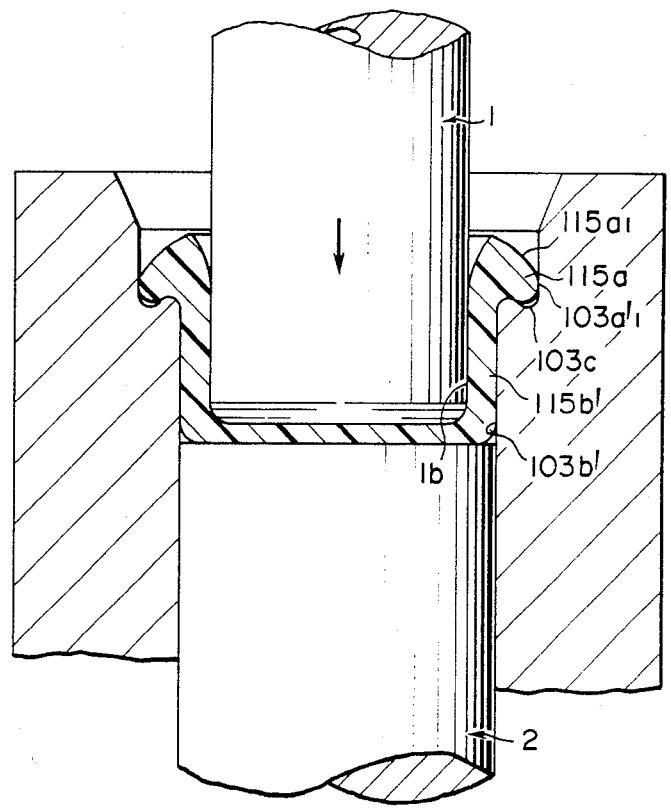

Then, as shown in FIGS. 13 and 14, the upper plunger 1 and the lower plunger 2 are simultaneously lowered within the lower cavity 103b while pressing the central portion 10a of the blank 10. By the same procedure as above, the pressure in the former stage of the lowering (in general, the stage where the lowering reaches about from 15 to 40% of the whole stroke) is made relatively high in order to enlarge the compressed amount of the central portion 10a, i.e., the amount of material extending out from between both the plungers 1 and 2 so that the sidewall portion 115b' formed by the material extending out substantially fills the gap between the inner surface 103b' of the lower cavity 103b and the side surface 1b of the upper plunger 1 as shown in FIG. 14.

Although from the initial stage of the lowering (see FIG. 13), the side surface 10m of the blank 10 has closely contacted the inner surface $103a_1'$ of the short cylinder-shaped portion $103a_1$, since the material is additionally supplied from the compressed central portion 10a to the peripheral edge portion 10b on the step portion 103c, the lower part of the peripheral edge portion 10b eats into the annular groove $103c_1$, and the upper part thereof swells, so that the pressure between the side surface 10m and the inner surface $103a_1'$ further increases.

Consequently, a shearing force acts on the vicinity of the boundary between the central portion 10a and the peripheral edge portion 10b. However, since the vicinity of the boundary is sufficiently supplied with the material from the central portion 10a, there is no possibility that the vicinity of the boundary will be broken by the shearing force. While the lowering is further progressed, there is no possibility that the peripheral edge portion 10b will enter the lower cavity 103b, making molding impossible to effect, since there is only an extremely small force downwardly pulling the sidewall portion 115b' in the former stage of the lowering, and since during the time the peripheral edge portion 10b forms the flange portion 115a having an outside surface $115a_1$ extending obliquely and downwardly outwardly, and engages with the step portion 103c and the inner surface $103a_1'$ through the flange portion 115a.

Figure 15:
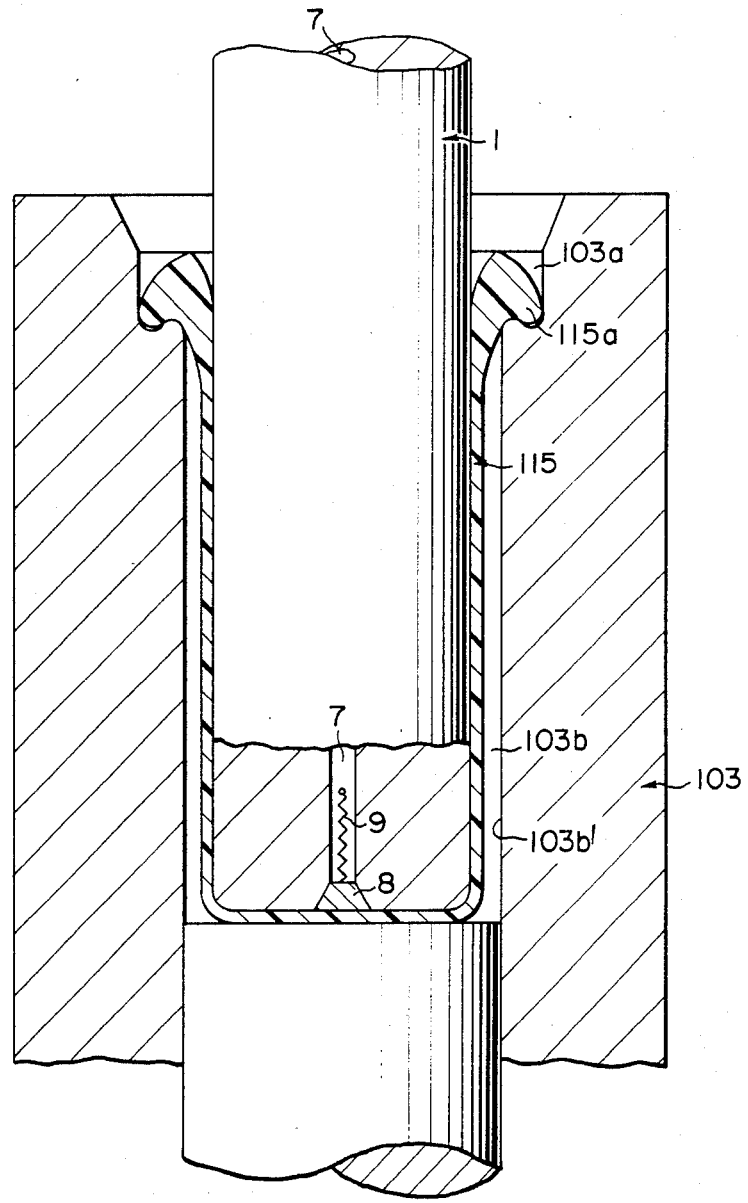

As described above, the material is accumulated in the above-mentioned gap in the former stage of the lowering. After the former stage, the lowering is continued with the pressure lowered, and a hollow molded piece 115 is formed as shown in FIG. 15. Then, the upper plunger 1 is raised while air is being blown into the hollow molded piece 115 to form the plastic container 111 having the flange portion 111a, the sidewall portion 111b and the bottom wall portion 111c as shown in FIG. 16.

The plastic container 111 can be formed into a hermetically sealed packed container by packing the container 111 with a product to be contained thereby and then heat-sealing the flange portion 111a with a top end member having an inner layer made of a heat-sealable resin or seaming the flange portion 111a with a metal cap having a curling portion.

Figure 16:
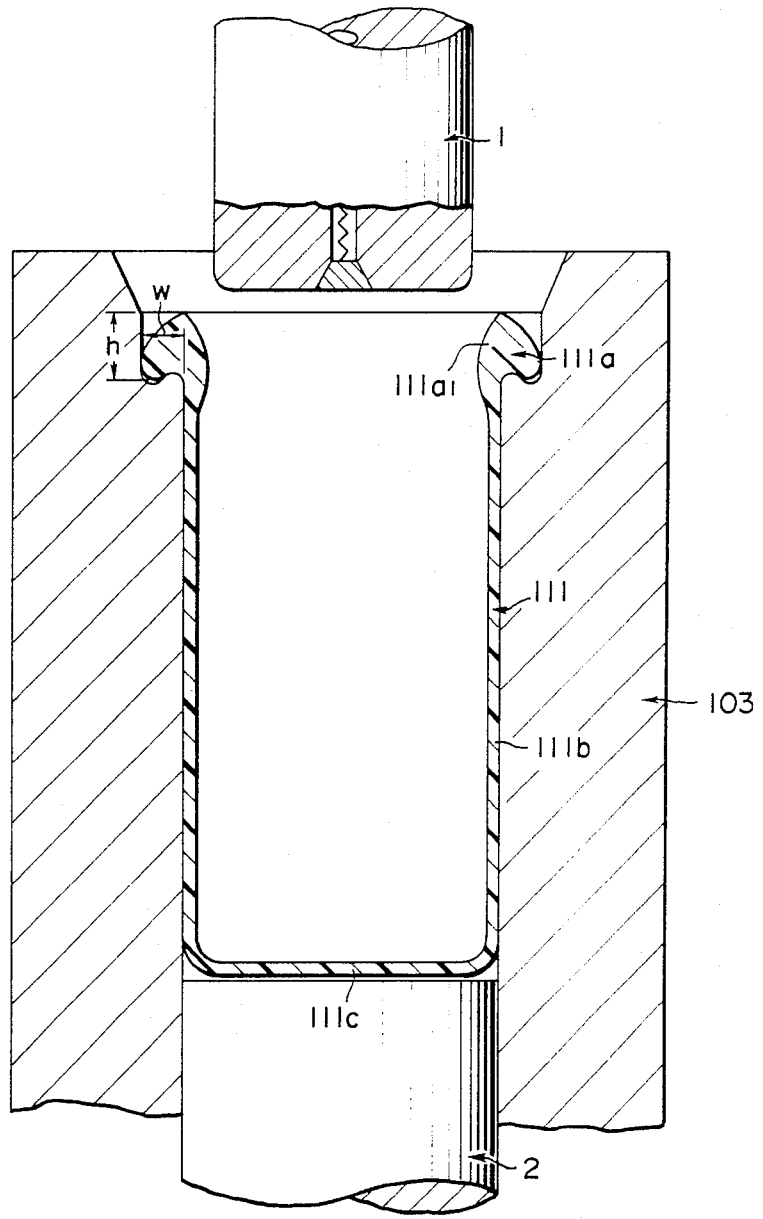

It is to be noted that although in FIG. 16 the inner surface of the flange portion 111a swells inwardly in the radial direction, forming a protuberant portion $111a_1$, the protuberant portion $111a_1$ is exaggeratedly shown because FIG. 16 is a section for explanation; actually, the radial height of the protuberant portion $11a_1$ is not more than about 0.5 mm, so that the protuberant portion $111a_1$ is substantially inconspicuous. In addition, the height h of the flange portion 111a is generally on the order of about 2 mm, while the projecting width w thereof is generally on the order of about 1.3 mm.

It is to be noted also that the portion of the die corresponding to the upper cavity may be constituted by a split die formed separately from the die main body, and the molding procedure may be such that under the state where the split die is open, the blank 10 is mounted on the step portion 103c and the lower plunger 2 and then, the split die is closed and the blank is tightly placed in the upper cavity. Moreover, the annular groove at the step portion and/or the annular land may be formed so as to have a rectangular section.

The above-described embodiment has merits that a plastic container can be manufactured with a simple apparatus and in a short period of time, since molding is carried out under the state where the peripheral edge portion of the blank is engaged by the step portion and the inner surface of the upper cavity, without clamping the peripheral edge portion.

The following is the description of a tubular plastic container having a molecularly oriented sidewall portion having substantially no possibility that the commercial value thereof may be damaged owing to thermal shrinkage on hot packing, together with a method and apparatus for manufacturing the same.

In FIGS. 17 through 20, a plastic container 201 has a substantially cylindrical sidewall portion 202 and a bottom wall portion 203, together with a flange portion 204 formed at the upper end part of the sidewall portion 202. The upper portion 202a of the sidewall portion 202 is cylindrical, while the portion 202b lower than the upper portion 202a has thick wall portions 202m extending axially and having a relatively large wall thickness (e.g., about 0.35 mm) and a large curvature, and thin wall portions 202n extending axially and having a relatively small wall thickness (e.g., about 0.25 mm) and a small curvature, which are formed alternately (four portions for each in case of the illustrated one) being substantially equally spaced in the circumferential direction.

Correspondingly, the bottom wall portion 203 also has thick wall projecting portions 203m each connecting to the corresponding one of the thick wall portions 202m and having a substantially triangular shape with the peripheral edge side as one side thereof. A portion 203n between the adjacent thick wall projecting portions 203m and a portion 203p in the vicinity of the center of the bottom wall portion 203 are relatively small in wall thickness.

The container 201 is made of a molecularly orientable thermoplastic and has the sidewall portion 202 molecularly oriented to improve container properties such as transparency, strength, gas-barrier properties and so forth. In general, the thick wall portions 202m and the thin wall portions 202n are not so different in the molecular orientation degree from each other, and the molecular orientation degrees of both of them are substantially equal to each other.

Figure 17:
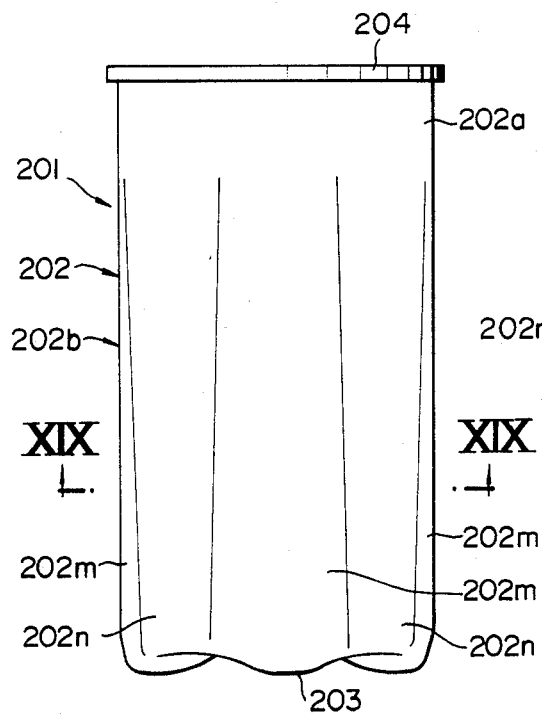
FIG. 17 is a front elevational view of another example of plastic containers manufactured by the method of the invention.
Figure 20:
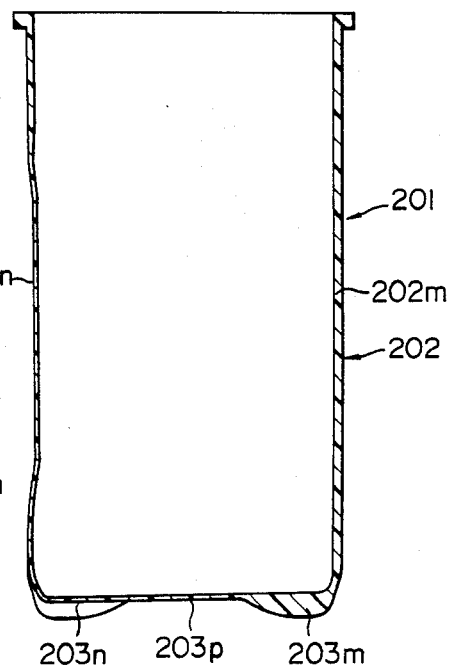
FIG. 20 is a sectional view taken along a line XX—XX of FIG. 18.
Figure 18:
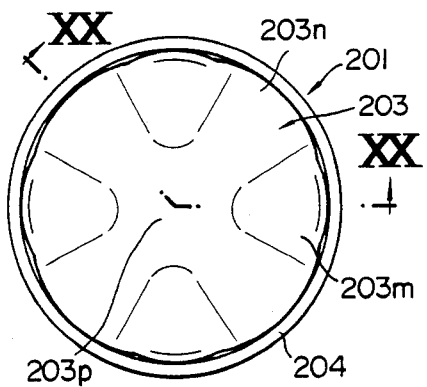
FIG. 18 is a bottom view of the container shown in FIG. 17.
Figure 19:
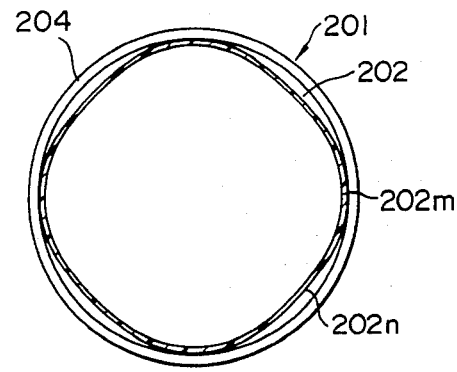
FIG. 19 is a sectional view taken along a line XIX—XIX of FIG. 17.
Figure 21:
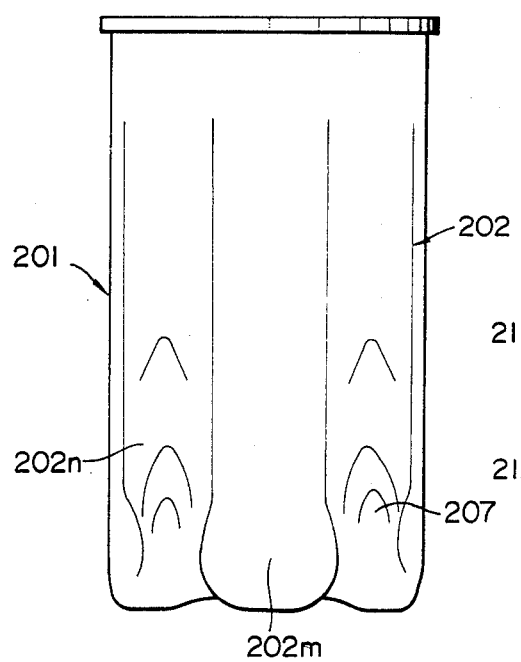
FIG. 21 is a front elevational view of the container shown in FIG. 17 after hot packing, hermetically sealing, cooling and opening.

FIG. 21 shows the container 201 shown in FIG. 17 opened after packing the container 201 with orange juice of 90° C. (a head space height of 10 mm), heat-sealing the flange portion 204 with a top end member (not shown) for hermetically sealing the former and then cooling the container 201 to room temperature. The container 201 in this case was formed by employing a symmetrical five-layer laminate comprising A/C/B/C/A, in which: A is polypropylene forming both outer layers; B is ethylene-vinyl alcohol copolymer forming an inner layer having a thickness of 17 μm; and C is maleic anhydride modified polypropylene forming a bonding layer for bonding the outer layers and the inner layer. The outside diameter of the upper portion 202a of the sidewall portion 202 was 54 mm and the overall height of the sidewall portion was 95 mm. The average thickness of the thick wall portions 202m was 0.35 mm, the curvature radius thereof was 24 mm and the average molecular orientation degree thereof was a factor of 6.5. The average thickness of the thin wall portions 202n was 0.25 mm, the curvature radius thereof was 40 mm and the average molecular orientation degree thereof was a factor of 7.0. The average thickness of the thick wall projecting portions 203m at the bottom wall portion was 1.5 mm, and the average thickness of the portions 203n, 203p was 1.0 mm.

In FIG. 21, although the thick wall portions 202m has a height slightly reduced (by about 2 mm) owing to thermal shrinkage, there is substantially no deformation such as indentation resulting from thermal shrinkage and reduction in pressure, since the thick wall portions 202m function as a kind of support because of a large curvature and a large wall thickness. Although the thin wall portions 202n, particularly the lower portions thereof, have slightly indented portions 207, the position and extent of the indented portions 207 produced are fixed, and containers very slightly differ in the position and extent thereof from each other. Accordingly, there is hardly any reduction in the commercial value of the container, since consumers consider the container having the indented portions 207 to be a container having a proper shape as a hermetically sealed packing container.

Figure 22:
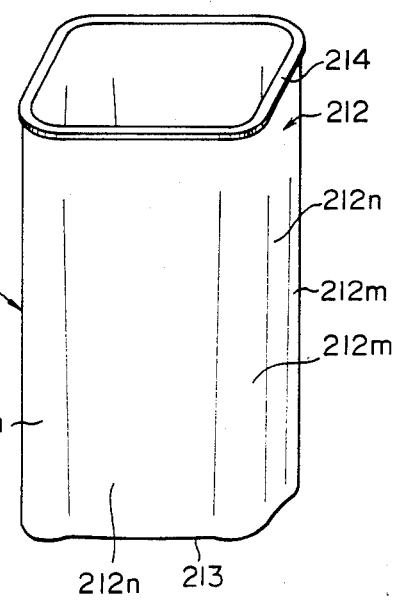
FIG. 22 is a perspective view of still another example of plastic containers manufactured by the method of the invention.

FIG. 22 shows a container 211 with a sidewall portion 212 having the shape of a square tube with round corners as well as molecularly oriented. The container 211 has a bottom wall portion 213 and a flange portion 214. Each of corner portions of the sidewall portion 212 having a curvature is constituted by a thick wall portion 212m having a relatively large wall thickness, while each of flat surface portions thereof having substantially no curvature is constituted by a thin wall portion 212n having a relatively small wall thickness. In addition, portions of the bottom wall portion 211 connecting to the respective thick wall portions 212m are made relatively large in wall thickness.

Also in this case, after hot packing, hermetically sealing and cooling, the thick wall portions 212m of the sidewall portion 212 are hardly deformed, and the thin wall portions 212n are uniformly indented. Therefore, there is hardly any reduction in the commercial value of the container.

The plastic container of this kind is manufactured as follows.

Figure 23:
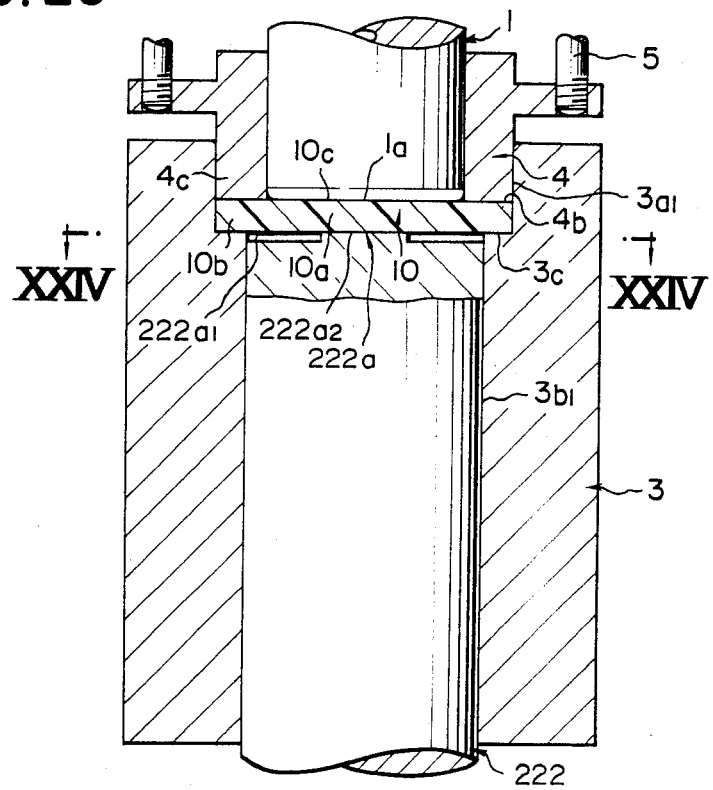
FIG. 23 is a vertical section showing a state just before the starting of molding of the plastic container shown in FIG. 17.
Figure 24:
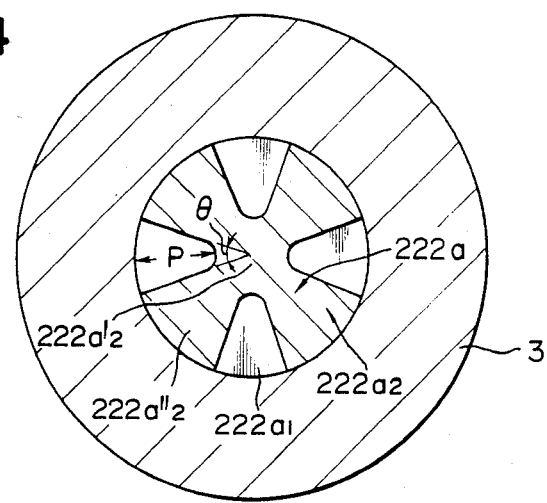
FIG. 24 is a sectional view taken along a line XXIV—XXIV of FIG. 23.
Figure 25:
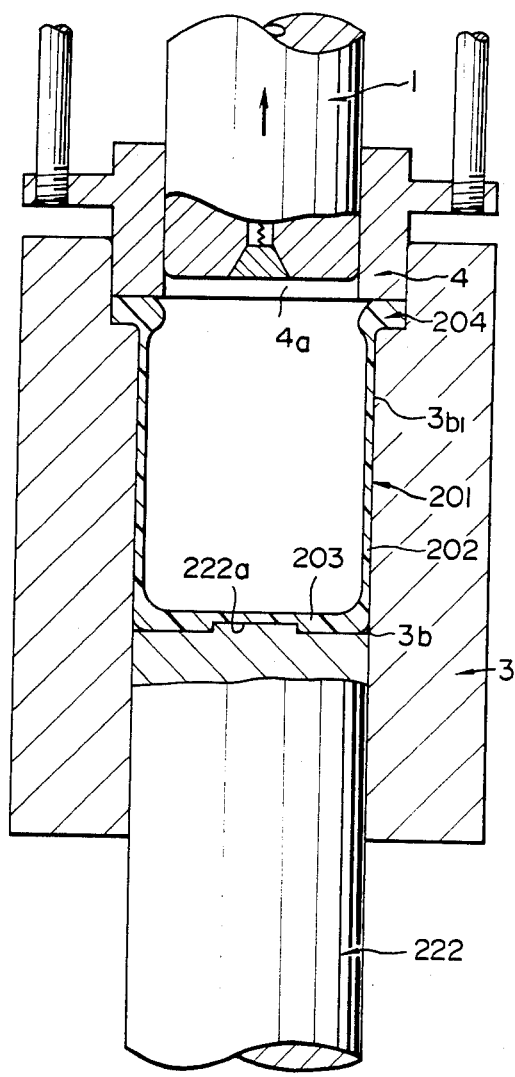
FIG. 25 is a vertical section showing a state just after completion of molding of the plastic container shown in FIG. 17.

In FIGS. 23 through 25, the same or similar portions or members as those in FIGS. 2 through 6 are denoted by the same reference numerals.

A lower plunger 222 is adapted to be slidable in the lower cavity 3b. The lower plunger 222 has on its upper surface 222a a plurality (four in the drawing) of recesses 222a1 formed being equally spaced in the circumferential direction and each having the shape of a triangle employing the peripheral edge portion of the upper surface 222a as one side thereof, i.e., this portion is open, as well as having a flat bottom surface. On the other hand, the vicinity of the center 222a'2 and each portion 222a"2 between the adjacent recesses 222a1 are constituted by a flat protrusions 222a2. The depth of each recess 222a1 is generally from 0.5 to 2.0 mm.

Although molding is carried out in the same manner as that shown in FIGS. 2 through 6 by employing the apparatus provided with the lower plunger 222 having the above structure, in stretching in the later stage of the molding, the amount of material extending out from between the upper and lower plungers 1 and 222 differs between the recesses 222a1 formed in the lower plunger upper surface and the protrusions 222a"2 formed between the adjacent recesses 222a1: the amount of the material extending out from the former is larger than that from the latter. Consequently, the wall thickness of the portions corresponding to the recesses 222a1 of the sidewall portion of a hollow molded piece (corresponding to 15 of FIG. 4) becomes larger than that of the portions corresponding to the protrusions 222a"2.

Then, when the sidewall portion is brought into contact with the inner surface 3b1 of the lower cavity by blowing a pressurized air into the hollow molded piece, the thin wall portions of the sidewall portion of the hollow molded piece corresponding to the protrusions 222a"2 are cooled to harden and circumferentially shrink prior to the thick wall portions of the sidewall portion corresponding to the recesses 222a1, pulling from both circumferential sides the thick wall portions slowly cooled and still remaining in the unhardened state (i.e., under a molecularly orientable temperature). Consequently, the thick wall portions are circumferentially bent so as to have a curvature larger than that of the thin wall portions. This is the supposed reason for formation of the thick wall portions 202m having a large curvature and the thin wall portions 202n having a small curvature.

Figure 26:
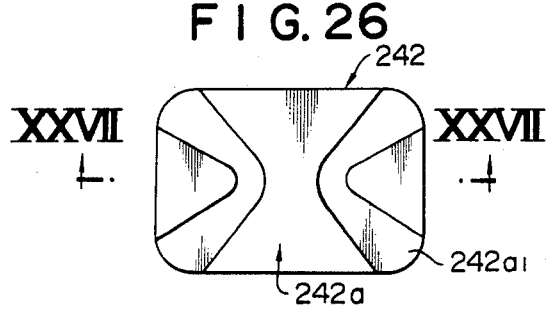
FIG. 26 is a plan view of an example of the low plunger employed for manufacturing the plastic container shown in FIG. 22.
Figure 26:
Figure 26:
Figure 27:
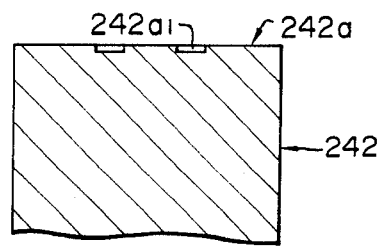
FIG. 27 is a sectional view taken along a line XXVII—XXVII of FIG. 26.

The container 211 having the sidewall portion 212 in the shape of a square tube with round corners, shown in FIG. 22, can be manufactured by the same method as that for the container 201 by employing an upper plunger and a die cavity each having a shape corresponding to that of the sidewall portion 212, together with a lower plunger 242 having recesses 242a1 formed in the upper surface 242a and extending from the respective corners toward the center thereof as shown in FIGS. 26 and 27.

Figure 28:
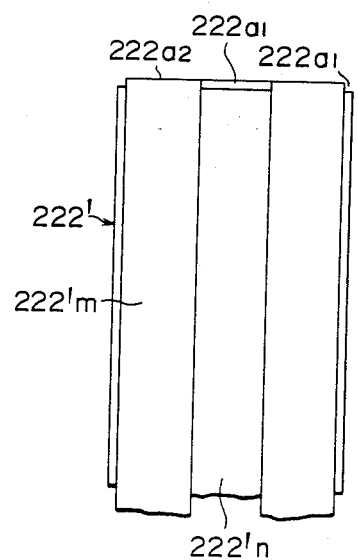
FIG. 28 is a front elevational view of an example of the lower plunger employed for manufacturing a plastic container of the type shown in FIG. 17 and having a flat bottom wall portion.

The bottom wall portion of the container 201 may be flat. Such a bottom wall portion is formed as follows, as shown in FIG. 28. By employing a lower plunger 222' comprising a main body 222'm axially extending correspondingly to the protrusions 222a2 and a plurality (four in this case) of sliding members 222'n axially extending correspondingly to the recesses 222a1 and adapted to be slidable along the main body 222'm, molding is carried out under the state where the recesses 222a1 are provided and in the same manner as above until just before the end of the late stage of the formation of the above-mentioned hollow molded piece. The, in the end, the sliding members 222'n are raised along the main body 222'm until the upper surfaces of the sliding members 222n and the upper surface of the main body 222'm are aligned with each other on the same level in order to extend out the material in the recesses 222a1, thereby allowing a flat bottom wall portion to be formed. For the container 211, it is possible to form a flat bottom wall portion by the same method as above.

A practical example will be described hereinunder.

Example 2.

A blank having a diameter of 60 mm was punched out from a laminate having a thickness of 3 mm and comprising layers of A/C/B/C/A, in which: A is a polypropylene having a melt flow index of 6 g/10 min. and a melting point of 165° C. for forming both outer layers; B is an ethylene-vinyl alcohol copolymer having a vinyl alcohol content of 70 mol%, a melting point of 182° C. and a thickness of about 85 μm for forming an inner layer; and C is a maleic anhydride modified polypropylene having a melting point 162° C. for forming a bonding layer, and was uniformly heated up to 145° C. by means of an oven.

The molding apparatus of the type shown in FIG. 23 and with a drive mechanism of the type shown in FIG. 9, which is provided with a lower plunger having on its upper surface four recesses 222a1 each having the shape (P=19 mm, a center angle $\theta=45°$ and a depth of 1.2 mm) shown in FIG. 24, was heated by means of built-in heaters so that the surface (to be in contact with the blank during molding) temperatures of the upper plunger (a diameter of 53.3 mm), the lower plunger (a diameter of 54.2 mm) and the lower cavity (an inside diameter of 55 mm) would be 140° C., 95° C. and 80° C., respectively. The inside diameter of each of the hydraulic cylinders 16, 17 was 100 mm.

The above-mentioned blank was placed in the upper cavity, and the blank peripheral edge portion was clamped with a pressure of 2 kg/cm² by means of the holding pad. Then, the blank central portion was introduced into the lower cavity at a speed of about 30 mm/sec., while a pressure of 45 kg/cm² was being applied to the blank central portion by means of the upper and lower plungers by employing the drive mechanism of the type shown in FIG. 9. When the upper surface of the lower plunger reached the position 20 mm deep from the upper end of the lower cavity, the pressure of the hydraulic cylinder was reduced to 20 kg/cm² in order to increase the lowering speed of the upper and lower plungers 1 and 222. Then, the molding was continued until the upper surface of the lower plunger reached the position 100 mm deep from the upper end of the lower cavity to form a hollow molded piece.

Thereafter, while the upper plunger was being raised, a pressurized air having a pressure of 6 kg/cm² was sent into the hollow molded piece in order to bring the sidewall portion of the hollow molded piece into close contact with the inner surface of the lower cavity, thereby cooling the sidewall portion and the bottom wall portion to harden. Then, the holding pad and the lower plunger were raised to obtain a container 201 having the shape shown in FIG. 17. The sidewall portion 202 was excellent in transparency. The outside diameter of the upper portion 202a thereof was 54 mm, and the overall height was 95 mm. The average thickness of the thick wall portions 202m was 0.35 mm, the curvature radius thereof was 24 mm and the average molecular orientation degree was a factor of 6.5. The average thickness of the thin wall portions 202n was 0.25 mm, the curvature radius thereof was 40 mm and the average molecular orientation degree was a factor of 7.0.

Although the invention has been described through specific terms, it is to be noted here that the described embodiments are not exclusive and various changes and modifications are possible. For example, the introduction of the plastic blank central portion into the die cavity may be effected by raising the die 3 without moving the upper and lower plungers 1 and 222 practically (there is, however, a slight movement thereof accompanying pressing).

What is claimed is:

1. A method of manufacturing a tubular plastic container having a flange portion, a sidewall portion and a bottom wall portion, at least said sidewall portion being molecularly oriented, comprising the steps of
   bringing a peripheral edge portion, corresponding to said flange portion, of a flat blank of a molecularly orientable plastic into engagement with a shoulder portion of a die, said blank having a practically uniform thickness and having a temperature not higher than the molecularly orientable temperature range of said plastic, said engagement being effected by employing a die having a first cavity with an inside diameter practically equal to an outside diameter of said flange portion and a second cavity with an inside diameter practically equal to an outside diameter of said sidewall portion, said first cavity and said second cavity being connected to each other through a die shoulder portion comprising a step portion constituted by an annular groove connecting to an inner surface of said first cavity and an annular land located at an inner side of said annular groove, said blank having a diameter slightly larger than said inside diameter of said first cavity, and tightly placing said blank into said first cavity of said die, without applying axial pressure to said peripheral edge portion of said blank while forming said sidewall portion;
   introducing said blank into said second cavity of said die while compressing a central portion of said blank substantially corresponding to said bottom wall portion by means of a first plunger and an opposing second plunger, a side surface of said first plunger being kept at a temperature substantially in the molecularly orientable temperature range of said plastic;
   forming said sidewall portion from material of said blank extending out from between said first plunger and said second plunger by bringing said material into contact with said side surface of said first plunger, thereby forming a hollow molded piece; and
   discharging a pressurized fluid to the inside of said hollow molded piece while withdrawing said first plunger in order to expand said sidewall portion until said sidewall portion is brought into contact with said inner surface of said second cavity held at a temperature not higher than the lower limit of said molecularly orientable temperature range, thereby cooling said sidewall portion to harden.

2. The method according to claim 1, wherein said formation of said hollow molded piece is such that, in an early stage of said introduction of said blank into said second cavity the speed of said introduction is made relatively low and said pressure applied by said first plunger and said second plunger is made relatively high in order to accumulate material extending out in a gap between said first plunger and said inner surface of said second cavity so that said material substantially fills said gap, and then the speed of said introduction is increased at a controlled rate while at the same time said applied pressure is decreased in order to stretch said accumulated material to form said sidewall portion of said hollow molded piece.

3. A method of manufacturing a tubular plastic container having a flange portion, a sidewall portion and a bottom wall portion, said sidewall portion being molecularly oriented and having alternately formed in a circumferential direction thereof axially extending thick wall portions having a relatively large wall thickness and a large curvature and axially extending thin wall portions having a relatively small wall thickness and a small curvature, comprising:
   bringing a peripheral edge portion, corresponding to said flange portion, of a flat blank of a molecularly orientable plastic having a practically uniform thickness as well as a temperature not higher than the upper limit of the molecularly orientable temperature range of said plastic, into engagement with a shoulder portion of a die;
   introducing said blank into a cavity of said die while compressing a central portion of said blank substantially corresponding to said bottom wall portion by means of a first plunger and an opposing second plunger, a side surface of said first plunger being kept substantially in the molecularly orientable temperature range of said plastic, and said second plunger being formed with recesses on a surface thereof facing said first plunger, said recesses corresponding to said thick wall portions, and having peripheral edge portions thereof open;

forming said sidewall portion from material of said blank extending out from between said first plunger and said second plunger by bringing said material into contact with said side surface of said first plunger, thereby forming a hollow molded piece; and discharging a pressurized fluid to the inside of said hollow molded piece while withdrawing said first plunger from said cavity in order to expand said sidewall portion until said sidewall portion is brought into contact with an inner surface of said cavity held at a temperature not higher than the lower limit of said molecularly orientable temperature range, thereby cooling said sidewall portion to harden.

4. The method according to claim 3 wherein said formation of said hollow molded piece is such that, in an early stage of said introduction of said blank into said cavity the speed of said introduction is made relatively low and said pressure applied by said first plunger and said second plunger is made relatively large in order to accumulate material extending out in a gap between said first plunger and an inner surface of said cavity so that said material substantially fills said gap, and then said speed of said introduction is increased at a controlled rate while at the same time said applied pressure is decreased in order to stretch said accumulated material to form said sidewall portion of said hollow molded piece.

5. The method according to claim 3, wherein said engagement between said peripheral edge portion of said blank and said shoulder portion of said die is effected by mounting said blank on said shoulder portion of said die and applying axial pressure to said peripheral edge portion of said blank to clamp said peripheral edge portion of said blank to said shoulder portion of said die.

6. The method according to claim 3, wherein said second plunger comprises a main body and a plurality of sliding members, said sliding members extending correspondingly to said recesses and adapted to be axially slidable along said main body, and just after the formation of said hollow molded piece, causing said sliding members to slide such that said recesses diminish, thereby allowing said bottom wall portion to be formed flat.

* * * * *